United States Patent
Yoshikawa (10) Patent No.: US 6,253,093 B1
(45) Date of Patent: *Jun. 26, 2001

(54) WIRELESS COMMUNICATION SYSTEM, FIXED STATION DEVICE AND MOBILE STATION DEVICE

(75) Inventor: Munehiro Yoshikawa, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,815

(22) Filed: Jan. 7, 1998

(30) Foreign Application Priority Data

Jan. 7, 1997 (JP) .................................. 09-006599

(51) Int. Cl.[7] .............................. H04B 1/38; H04M 1/00
(52) U.S. Cl. ........................................... 455/557; 455/556
(58) Field of Search .................................... 455/557, 556, 455/561, 422, 517; 375/220, 285, 296

(56) References Cited

U.S. PATENT DOCUMENTS

| | | | | |
|---|---|---|---|---|
| 5,704,364 | * | 1/1998 | Saltzstein et al. | 128/696 |
| 5,742,640 | * | 4/1998 | Haoui et al. | 455/561 |
| 5,841,846 | * | 11/1998 | Abbruscato | 379/106.02 |
| 5,870,679 | * | 2/1999 | Ezumi | 455/557 |
| 5,884,190 | * | 3/1999 | Lintula et al. | 455/557 |
| 5,892,794 | * | 4/1999 | Slegers | 455/557 |
| 5,920,825 | * | 7/1999 | Patel et al. | 455/557 |
| 5,930,719 | * | 7/1999 | Babitch et al. | 455/462 |
| 5,950,124 | * | 9/1999 | Trompower et al. | 455/422 |
| 6,101,398 | * | 8/1998 | Joong et al. | 455/557 |

* cited by examiner

Primary Examiner—Nguyen T. Vo
Assistant Examiner—Duc Nguyen
(74) Attorney, Agent, or Firm—Jay H. Maioli (57) ABSTRACT

In a wireless communication system, which includes a fixed station device and a mobile station device, the efficiency of data communications is easily improved. In the present invention, the mobile station device comprises a connecting means to which a data terminal is connected, a transmitting means for transmitting first digital data inputted from the data terminal to the fixed station device, and a receiving means for receiving second digital data transmitted from the fixed station device and moreover, the fixed station device comprises a receiving means for receiving the first digital data, a modulating/demodulating means for modulating the first digital data and transmitting the resultant first modulated wave signal to the telephone network and for demodulating a second modulated wave signal inputted from the telephone network to form second digital data, and a transmitting means for transmitting the second digital data, so that the transmission data can be transmitted at the preset transmission rate in the wireless zone, and thus the efficiency of data communications can be easily improved.

4 Claims, 5 Drawing Sheets

WIRELESS COMMUNICATION SYSTEM, FIXED STATION DEVICE AND MOBILE STATION DEVICE

BACKGROUND OF THE INVENTION

1. Field of the Invention

The present invention relates to a wireless communication system, a fixed station device and a mobile station device, and more particularly, applied to a digital cordless telephone system.

2. Description of the Related Art

This type of digital cordless telephone system is comprised of a portable unit which is a cordless telephone and a base unit which is wireless-connected to the portable telephone and is wire-connected to the general telephone network via a wire connection line.

In the digital cordless telephone system, in a state where the base unit is wire-connected to a calling party via the telephone network, the user having the portable unit can talk with the calling party.

In recent years, in such digital cordless telephone system, the portable unit is connected, for example, to a personal computer (hereinafter, referred to as a PC) and this system has been used in the data communications between the PC and a PC of the party of data communications (hereinafter, referred to as a communicating party) which is wire-connected via the telephone network. Thus, the digital cordless telephone system has not been used only as a telephone but the range of its applications has been expanding.

Figure 4:
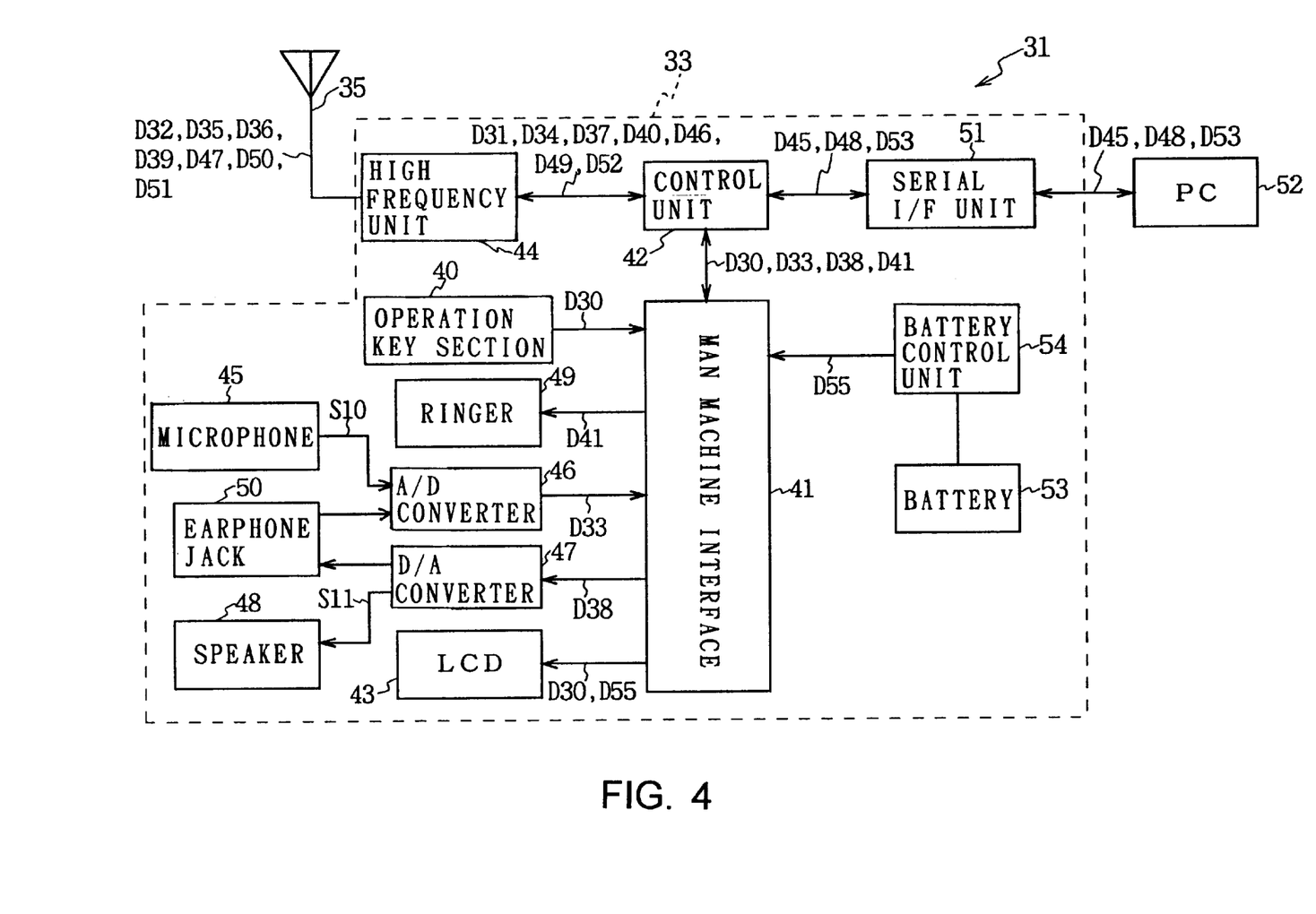
FIG. 4 is a block diagram showing the circuit configuration of a conventional portable unit.

In practice, as shown in FIG. 4, in a portable unit 1 of the digital cordless telephone system, when making a call (i.e., when making a call to the prescribed calling party from the portable unit 1), the user inputs call information by operating an operation key section 2 comprised of call keys and dial keys and thereby, first call information data D1 in digital form is sent from the operation key section 2 to a control unit 4 via a man machine interface 3. In this connection, the call information data D1 to be outputted from the operation key section 2 is also sent to a liquid crystal display (LCD) 5 via the man machine interface 3, and the LCD 5 displays call information shown by the inputted first call information data D1 (i.e., telephone number of the calling party).

In this case, the control unit 4, upon converting the data inputted from the man machine interface 3 into the data having a predetermined data format according to the data transmission by compression and the like (hereinafter, referred to as the format for transmission), transmits the data to a high frequency unit 6 and more over, converts the data inputted from the high frequency unit 6 into the data having the same data format as the data to be inputted from the man machine interface (hereinafter, referred to as the format for I/F) 3 by demodulation and the like. Thus, the control unit 4 converts the first call information data D1 inputted from the man machine interface 3 into the second call information data D2 having the format for transmission to output the data to the high frequency unit 6.

The high frequency unit 6 modulates the data inputted from the control unit 4 based on the control of the control unit 4 with a predetermined format to transmit the resultant transmission data to the base unit (not shown) via an antenna (hereinafter referred to as a portable unit side antenna) and moreover, receives the transmission data transmitted from the base unit via the portable unit side antenna, and demodulates the received transmission data based on the control of the control unit 4 with the predetermined format to modulate to the data having the aforementioned format for transmission. Thus, the high frequency unit 6 modulates the second call information data D2 inputted from the control unit 4 and transmits the resultant transmission data (hereinafter, referred to as call transmission data) D3 to the base unit via the portable unit side antenna.

At this point, when the base unit receives the call transmission data D3 and is wire-connected to the calling party via the telephone network based on the received call transmission data D3, the portable unit 1 receives the user's voice by a microphone 8.

The microphone 8, after converting an audio signal (hereinafter, referred to as a user audio signal) S1 which is analog corresponding to the inputted user's voice into voice data (hereinafter, referred to as first user voice data) D4 formed of digital data via an analog-to-digital converter (hereinafter, referred to as A/D converter) 9, transmits the voice data D4 to the control unit 4 via the man machine interface 3.

The control unit 4 converts the inputted first user voice data D4 into the voice data (hereinafter, referred to as second user voice data) D5 having the format for transmission to transmits this to the high frequency unit 6.

The high frequency unit 6 modulates the inputted second user voice data D5 to transmit the resultant transmission data (hereinafter, referred to as voice transmission data) D6 to the base unit via the portable unit side antenna 7. Moreover, the high frequency unit 6, upon receiving transmission data (hereinafter, referred to as the other party side transmission data) D7 corresponding to the voice data of the calling party (hereinafter, referred to as other party side voice data) transmitted from the base unit via the portable unit side antenna 7, demodulates the data D7 and transmits the resultant other party side voice data (hereinafter, referred to as first other party side voice data) D8 to the control unit 4.

The control unit 4 converts the inputted first other party side voice data D8 into other party side voice data D9 formed of the format for I/F (hereinafter, referred to as second other party side voice data) to transmit to the digital-to-analog converter (hereinafter, referred to as D/A converter) 10 via the man machine interface 3. The D/A converter 10 converts the second other party side voice data D9 into an audio signal (hereinafter, referred to as an other party side audio signal) S2 which is analog to transmit to a speaker 11. With this arrangement, in the portable unit 1, voice of the calling party is uttered from the speaker 11. Thus, the user can talk with the calling party with the portable unit 1.

Furthermore, when a call arrives (i.e., when receiving a call from the calling party), the portable unit 1 receives transmission data (hereinafter, referred to as ringer transmission data) D10 which is transmitted from the base unit and corresponds to ringer data to be obtained from the calling party by the high frequency unit 6, and the high frequency unit 6 demodulates the received ringer transmission data D10 to transmit the resultant first ringer data D11 to the control unit 4.

The control unit 4 converts the inputted first ringer data D11 into second ringer data D12 having the format for transmission to transmit the second ringer data D12 to a ringer 12 via the man machine interface 3. Thereby, the ringer 12 produces a ringer sound such as bell depending on the inputted second ringer data D12. Accordingly, the user knows the arrival of telephone call according to the ringer sound produced by the ringer 12, and then the user operates, for example, the call keys of the operation key section 2 to wire-connect the portable unit 1 to the calling party. Thus, the user and the calling party can communicate in the same way as the case of making a call described above.

Here, in the case of using the portable unit 1 for the data communications, a PC 15 is connected to an earphone jack 13 which is provided in the portable unit 1 via a modem unit 14.

In this case, in a state where the base unit is wire-connected to the communicating party of the data communications in the same way as the case of making a call or receiving a call described above, the PC 15 transmits digital data to be communicated D13 (hereinafter, referred to as first digital data) which is inputted by operating a keyboard or the like provided to the PC 15 by the user, to the modem unit 14.

The modem unit 14, forming a first modulated wave signal S3 showing the inputted first digital data D13 by phase-modulating a predetermined carrier wave according to the first digital data D13, outputs the signal S3 to the A/D converter 9. The A/D converter 9 converts the signal S3 into first modulated wave data D14 formed of digital data and then transmits the data D14 to the control unit 4 via the man machine interface 3.

The control unit 4 converts the inputted first modulated wave data D14 into the second modulated wave data D15 formed of the format for transmission to transmit to the high frequency unit 6, and the high frequency unit 6 modulates the inputted second modulated wave data D15 to transmit the resultant transmission data (hereinafter, referred to as first modulated wave transmission data) D16 to the base unit via the portable unit side antenna 7.

Furthermore, in the portable unit 1, in the case where the data is transmitted to the PC 15 from the communicating party, the high frequency unit 6 receives the transmission data (hereinafter, referred to as second modulated wave transmission data) D17 which is transmitted from the base unit and corresponds to the modulated wave data to be obtained from the communicating party, via the portable unit side antenna 7 to demodulate the transmission data D17, and transmits the resultant modulated wave data (hereinafter, referred to as third modulated wave data) D18 to the control unit 4.

The control unit 4 converts the inputted third modulated wave data D18 into modulated wave data D19 formed of the format for transmission (hereinafter, referred to as fourth modulated wave data) to transmit to the D/A converter 10 via the man machine interface 3. The D/A converter 10 converts the fourth modulated wave data D19 into a modulated wave signal (hereinafter, referred to as a second modulated wave signal) S4 to transmit to the modem unit 14.

The modem unit 14 detects the phase displacement point of the inputted second modulated wave signal S4 and demodulates the second modulated wave signal S4 based on the detected phase displacement point, and transmits the resultant digital data (hereinafter, referred to as second digital data) D20 to the PC 15. Then, based on the inputted second digital data D20, the PC 15 displays the content of the second digital data D20 on the display unit provided to the PC 15, so that the user can visually confirm the content of data communications.

In this connection, a battery 16 is provided in the portable unit 1 which works depending on the electric power to be obtained from the battery 16.

The battery 16 is charged by a battery (not shown) provided outside of the portable unit 1 via a battery control unit 17.

In this case, the battery control unit 17 can charge the battery 16 protecting it from over-charge and moreover, sends the remaining capacity of the battery 16 as battery information data D21 to the LCD 5 via the man machine interface 3 and makes the LCD 5 to display information of the battery 16 shown by the battery information data D21.

Figure 5:
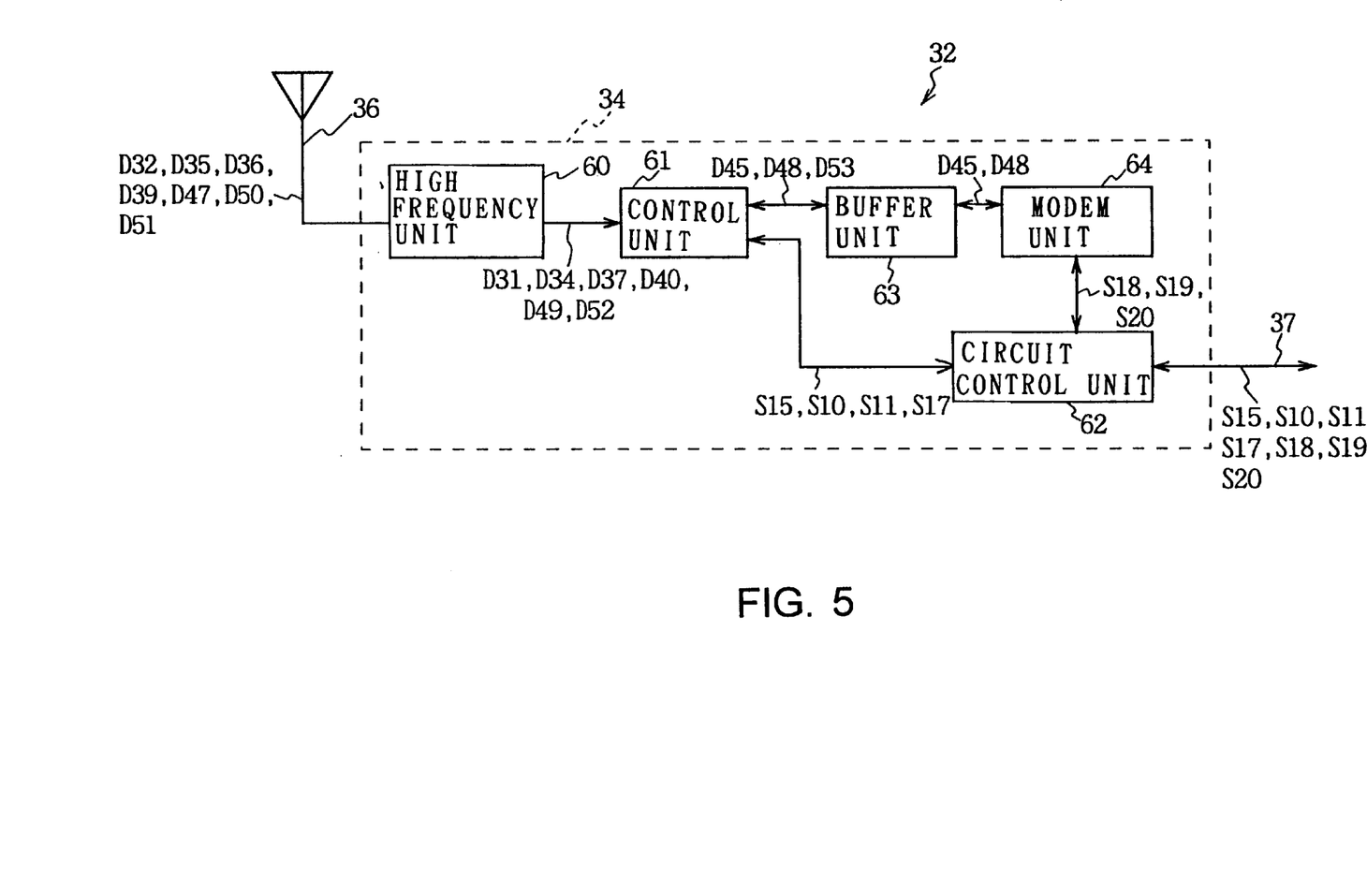
FIG. 5 is a block diagram showing the circuit configuration of a conventional base unit.

Moreover, as shown in FIG. 5, in the base unit 20 of the digital cordless telephone system, when the portable unit 1 makes a call, the call transmission data D3 transmitted from the portable unit 1 is received by a high frequency unit 22 via an antenna (hereinafter, referred to as a base unit side antenna) 21.

In this case, the high frequency unit 22 demodulates the transmission data received via the base unit side antenna 21 with a prescribed format based on the control of the control unit 23 to convert the transmission data into data formed of the format for transmission in the similar way to the high frequency unit 6 of the portable unit 1 described above and transmits the data to the control unit 23 and moreover, modulates the data to be inputted from the control unit 23 by the control of the control unit 23 with a prescribed format to convert the data into transmission data. Thus, the high frequency unit 22 demodulates the call transmission data D3 received via the base unit side antenna 21 and transmits the resultant second call information data D2 to the control unit 23.

The control unit 23 converts the data formed of the format for transmission inputted from the high frequency unit 22 into the data formed of the I/F format in the similar way to the control unit 4 of the portable unit 1 described above and then converts the data into an analog signal through the D/A converter provided inside to transmit this to the telephone network through the circuit control unit 24 and wire connection line 25 successively and moreover, digitizes the analog signal to be inputted from the circuit control unit 24 via the A/D converter provided inside and converts the digitized data into data formed of the format for transmission to transmit to the high frequency unit 22. Therefore, the control unit 23 firstly converts the call information data D2 inputted from the high frequency unit 22 into the first call information data formed of the I/F format, and then converts the first call information data into the call information signal S6 which is analog via the D/A converter, and transmits the signal S6 to the telephone network via the circuit control unit 24 and the wire connection line 25 successively. Thus, in the telephone network, the base unit 20 and the calling party will be wire-connected based on the inputted call information signal S6.

At this point, in a state where the base unit 20 is wire-connected to the calling party via the telephone network, the voice transmission data D6 transmitted from the portable unit 1 is received by the high frequency unit 22 via the base unit side antenna 21.

The high frequency unit 22 demodulates the received voice transmission data D6 and transmits the resultant second user voice data D5 to the control unit 23. The control unit 23 converts the inputted second user voice data D5 into the first user voice data, and then converts the data into the user audio signal S1 to transmit to the telephone network via the circuit control unit 24 and the wire connection line 25 in order.

Furthermore, the base unit 20 supplies the other party side audio signal S2 to be obtained from the calling party via the telephone network to the control unit 23 via the wire connection line 25 and the circuit control unit 24 in order.

The control unit 23, after converting the inputted other party side audio signal S2 into the digitized first other party side voice data via the D/A converter, converts the data into the first other party side voice data D8 formed of the format for transmission to transmit to the high frequency unit 22.

The high frequency unit 22 modulates the inputted first other party side audio signal S2 to transmit the resultant other party side transmission data D7 to the portable unit 1 via the base unit side antenna 21. In this way, the base unit 20 enables the user having the portable unit 1 and the calling party to talk to each other.

Furthermore, in the base unit 20, when a call arrives in the portable unit 1, the ringer signal S7 which is analog to be obtained from the calling party via the telephone circuit network is inputted to the control unit 23 via the wire connection line 25 and the circuit control unit 24 in order, and the control unit 23 converts the inputted ringer signal S7 into the first ringer data D11 to transmit to the high frequency unit 22.

The high frequency unit 22 modulates the inputted first ringer data D11 and transmits the resultant ringer reception data D10 to the portable unit 1 via the base unit side antenna 21. In this way, when the portable unit 1 and the calling party are wire-connected, the base unit 20 enables the user and the calling party to talk to each other in the similar way to the case of making a call described above.

Furthermore, in the base unit 20, in the case where the data is transmitted to the communicating party from the PC 15 connected to the portable unit 1, in a state of being wire-connected to the communicating party in the similar way to the case of making a call and receiving a call described above, the high frequency unit 22 receives the first modulated wave transmission data D16 transmitted from the portable unit 1 via the base unit side antenna 21.

The high frequency unit 22 demodulates the received first modulated wave transmission data, and transmits the resultant second modulated wave data D15 to the control unit 23. The control unit 23 converts the inputted second modulated wave data D15 into the first modulated wave signal S3 to transmit to the telephone network via the circuit control unit 24 and the wire connection line 25 in order.

Furthermore, in the base unit 1, when transmitting the data to the PC 15 connected to the portable unit 1 from the communicating party, the second modulated wave signal S4 which is analog to be obtained from the communicating party via the telephone network is inputted to the control unit 23 via the wire connection line 25 and the circuit control unit 24 in order. The control unit 23, after converting the inputted digital second modulated wave signal S4 into third modulated wave data D18 formed of digital data, transmits the data to the high frequency unit 22.

The high frequency unit 22 modulated the inputted third modulated wave data D18 to transmit the resultant second modulated wave transmission data D17 to the portable unit 1 via the base unit side antenna 21. Accordingly, the base unit 20 enables the PC 15 wire-connected to the portable unit 1 and the communicating party to communicate data to each other.

In the digital cordless telephone system constructed as described above, the transmission rate of the wireless zone between the portable unit 1 and the base unit 20 is set to become approximately 28800 (bps) in advance. At this point, in the digital cordless telephone system, if the first modulated wave transmission data D16 (or the second modulated wave transmission data D17) is transmitted in the wireless zone at the transmission rate described above, it is necessary to sample and digitize the first modulated wave signal S3 (or the second modulated wave signal S4) with the comparatively high predetermined sampling frequency corresponding to the transmission rate in the A/D converter 9 of the portable unit 1 (or the A/D converter in the control unit 23 of the base unit 20) and the first modulated wave signal S3 (or the second modulated wave signal S4) may be sampled at the timing more than the cycle of its phase displacement point.

However, in the case of converting the digitized first modulated wave data D15 (or the fourth modulated wave data D19) into analog form again and demodulating at the communicating party side (or the portable unit 1), it was difficult to detect the phase displacement point of the analog first modulated wave signal S3 (or the second modulated wave signal S4) and it was difficult to demodulate the first modulated wave signal S3 (or the second modulated wave signal S4).

Furthermore, in the control unit 23 (or the circuit control unit 24) of the base unit 20 (or the portable unit 1), in the case of compressing and demodulating the second modulated wave data D15 (or the third modulated wave data D16), it was difficult to detect the phase displacement point.

In addition to these problems, in the digital cordless telephone system, by digitizing the first modulated wave signal S3 at the portable unit 1 and converting the digitized first modulated wave data D15 into analog form at the base unit 20, the first modulated wave signal S3 obtained by the portable unit 1 is converted into digital data and analog signal repeatedly, so that noise may occur in the first modulated wave data D15 and the first modulated wave signal S3 every modulation and it has a problem in that the phase displacement point of the first modulated wave signal S3 is difficult to be detected.

Accordingly, in the digital cordless telephone system, the first modulated wave data D16 (or the second modulated wave data D17) could be transmitted in the wireless zone between the portable unit 1 and the base unit 20 at the transmission rate approximately 9600 (bps) at the maximum, thus the data communications was very inefficient.

SUMMARY OF THE INVENTION

In view of the foregoing, an object of this invention is to provide a wireless communication system and a fixed station device and mobile station device capable of easily improving the data communication efficiency.

The foregoing objects and other objects of the invention have been achieved by the provision of a wireless communication system in a first invention, in which a mobile station device comprises a connecting means to which a predetermined data terminal is connected, a transmitting means for transmitting first digital data to be inputted from the data terminal, which is connected to the connecting means, to a fixed station device via the connecting means, a receiving means for receiving second digital data transmitted from the fixed station device, and a first error correcting means for correcting errors occurred in the second digital data in the wireless zone between the mobile station device and the fixed station device and transmitting the error-corrected second digital data to the data terminal via the connecting means and moreover, the fixed station device comprises a receiving means for receiving the first digital data transmitted from the mobile station device, a second error correcting means for correcting errors occurred in the first digital data in the wireless zone, a modulating/demodulating means for modulating the first digital data outputted from the second error correcting means and transmitting the first modulated wave signal, which is obtained by the modulation, to the telephone network and moreover, for demodulating the second modulated wave signal inputted from the telephone network to form the second digital data, and a transmitting means for transmitting the second digital data outputted from the modulating/demodulating means to the mobile station device.

Furthermore, in a second invention, the fixed station device comprises a receiving means for receiving the first digital data transmitted from the mobile station device, an error correcting means for correcting errors occurred in the first digital data in the wireless zone between the mobile station device and the fixed station device, a modulating/demodulating means for modulating the first digital data outputted from the error correcting means and transmitting the first modulated wave signal, which is obtained by modulation, to the telephone network and moreover, for demodulating the second modulated wave signal inputted from the telephone network to form the second digital data, and a transmitting means for transmitting the second digital data, which is outputted from the modulating/demodulating means, to the mobile station device.

Furthermore, in a third invention, the mobile station device comprises a connecting means to which the predetermined data terminal is connected, a transmitting means for transmitting the first digital data to be inputted via the connecting means from the data terminal, which is connected to the connecting means, to the fixed station device, a receiving means for receiving the second digital data transmitted from the fixed station device, and an error correcting means for correcting errors occurred in the second digital data in the wireless zone between the mobile station device and the fixed station device and transmitting the second digital data to the data terminal via the connecting means.

Accordingly, in the first invention, the mobile station device comprises the connecting means to which the data terminal is connected, the transmitting means for transmitting the first digital data which is inputted from the data terminal via the connecting means, to the fixed station device, the receiving means for receiving the second digital data transmitted from the fixed station device, and the first error correcting means for correcting errors occurred in the second digital data in the wireless zone between the mobile station device and the fixed station device and transmitting the error-corrected second digital data to the data terminal via the connecting means and moreover, the fixed station device comprises the receiving means for receiving the first digital data transmitted from the mobile station device, the second error correcting means for correcting errors occurred in the first digital data in the wireless zone, the modulating/demodulating means for modulating the first digital data outputted from the second error correcting means and transmitting the first modulated wave signal, which is obtained by modulation, to the telephone network and moreover, for demodulating the second modulated wave signal inputted from the telephone network to form the second digital data, and the transmitting means for transmitting the second digital data outputted from the modulating/demodulating means to the mobile station device, so that the first digital data and the second digital data can be transmitted at the preset transmission rate in the wireless zone between the mobile station device and the fixed station device and moreover, the frequency of the occurrence of errors between the data terminal and the communicating party wire-connected to the fixed station device via the telephone network can be greatly reduced.

Moreover, in the second invention, the fixed station device comprises the receiving means for receiving the first digital data transmitted from the mobile station device, the error correcting means for correcting errors occurred in the first digital data in the wireless zone between the mobile station device and the fixed station device, the modulating/demodulating means for modulating the first digital data outputted from the error correcting means and transmitting the first modulated wave signal, which is obtained by modulation, to the telephone network and moreover, for demodulating the second modulated wave signal inputted from the telephone network to form the second digital data, and the transmitting means for transmitting the second digital data, which is transmitted from the modulating/demodulating means, to the mobile station device, so that the second digital data can be transmitted at the preset transmission rate in the wireless zone from the fixed station device to the mobile station device and moreover, by correcting errors occurred in the first digital data in the wireless zone, the occurrence frequency of errors between the data terminal and the communicating party wire-connected to the fixed station device via the telephone network can be greatly reduced.

Furthermore, in the third invention, the mobile station device comprises the connecting means to which the data terminal is connected, the transmitting means for transmitting the first digital data to be inputted from the data terminal via the connecting means, to the fixed station device, the receiving means for receiving the second digital data transmitted from the fixed station device, and the error correcting means for correcting errors occurred in the second digital data in the wireless zone between the mobile station device and the fixed station device and transmitting the second digital data to the data terminal via the connecting means, so that the first digital data can be transmitted in the wireless zone from the mobile station device to the fixed station device at the preset transmission rate and moreover, by correcting errors occurred in the second digital data in the wireless zone, the frequency of the occurrence of errors between the data terminal and the communicating party can be reduced. Moreover, since the second digital data is transmitted to the data terminal after its errors are corrected, the reliability of the data communications can be further improved.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiment of this invention will be described with reference to the accompanying drawings:

An embodiment of the present invention will be described in detail with reference to the accompanying drawings.

Figure 1:
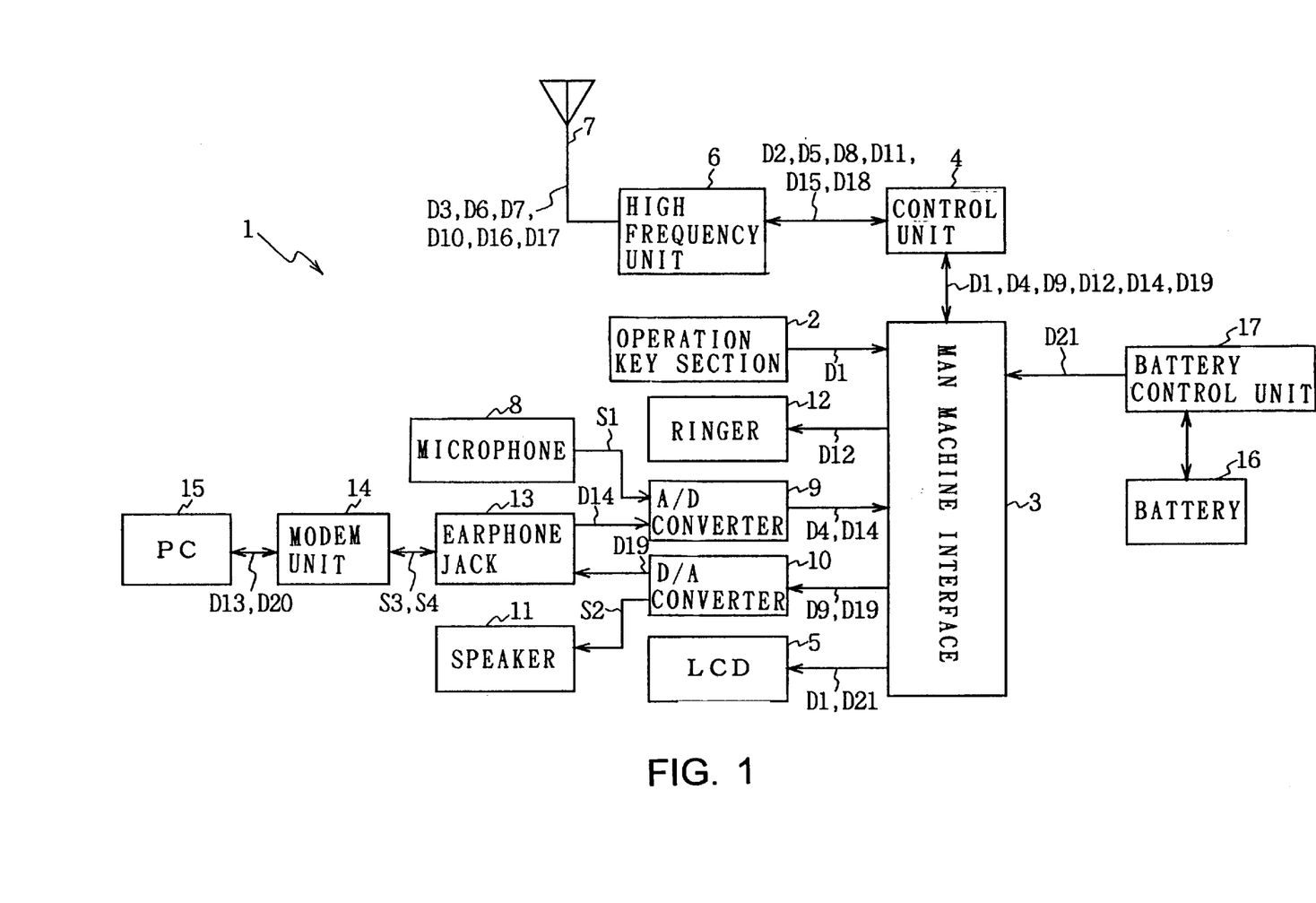
FIG. 1 is a block diagram showing one embodiment of the construction of a digital cordless telephone system according to the present invention.

In FIG. 1, numeral 30 shows a digital cordless telephone system according to the present invention as a whole, in which a portable unit 31 and a base unit 32 are wireless-connected through an antenna 35 of the portable unit side and an antenna 36 of the base unit which are provided corresponding to main bodies 33 and 34 respectively, and the main body of the base unit 32 is wire-connected via a wire connection line 37, for example, to the general telephone network.

Figure 2:
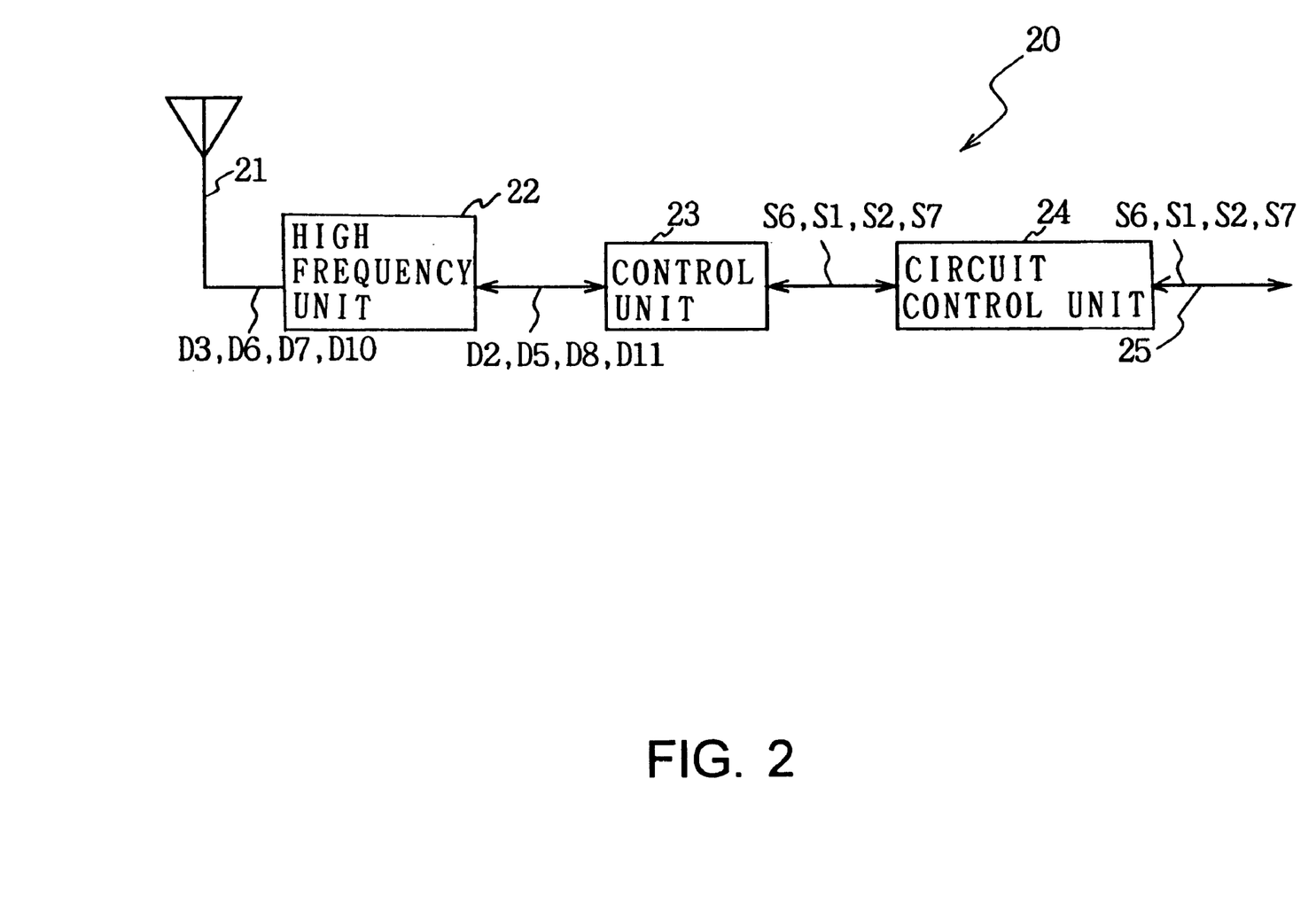
FIG. 2 is a block diagram showing one embodiment of the circuit configuration of a portable unit.

Here, as shown in FIG. 2, in the portable unit 31 according to the present invention in the digital cordless telephone system 30, when making a call, the user inputs call information by operating an operation key section 40 consisting of call keys and dial keys, thereby first call information data D30 formed of digital data corresponding to the call information will be transmitted from the operation key section 40 to the control unit 42 via a man machine interface 41.

In this connection, the first call information data D30 to be outputted from the operation key section 40 is also transmitted to LCD 43 via the man machine interface 41 and the LCD 43 can display the call information showed by the inputted first call information data 30 (such as the telephone number of the other party).

In this case, in the control unit 42, for example, the high level data link control procedure (HDLC) system is applied, in which the data which is inputted from the man machine interface 41 and has a prescribed data format (hereinafter, referred to as a first data format) is compressed with a prescribed system and is converted into data having a prescribed data format (hereinafter, referred to as a second data format) by adding a cyclic redundancy check (CRC) code corresponding to the data, to transmit to a high frequency unit 44.

Furthermore, the data formed of the second data format will be inputted in the control unit 42 from the high frequency unit 44, and the control unit 42 converts the data inputted from the high frequency unit 44 into the first data format to write in a buffer (not shown) provided inside. Under this condition, the control unit 42 judges based on the CRC added to the data whether or not errors occur in the data. If errors occur in the data, errors in the data can be corrected by requesting the retransmission of data to the base unit 32 as necessary. Thus, the control unit 42 can correct errors occurred in the data in the wireless zone between the portable unit 31 and the base unit 32 and then can read out the data from the buffer to output.

Note that, an error occurrence detecting circuit (not shown) is provided in the control unit 42 for detecting the frequency of the occurrence of errors occurred in the data, and the error occurrence detecting circuit detects the frequency of the occurrence of errors occurred in the data (i.e., errors occurred in the data in the wireless zone between the portable unit 31 and the base unit 32), and as a result of the detection, if the occurrence number of errors is less than the prescribed value set in advance, the error occurrence detecting circuit stops the error correction. Thus, in the control unit 42, the data processing add-ons can be reduced depending on the frequency of the occurrence of errors occurred in the data.

With this arrangement, the control unit 42 firstly converts the first call information data D30 inputted from the man machine interface 41 into the second call information data D31 formed of the second data format to transmit to the high frequency unit 44.

The high frequency unit 44 modulates the data inputted from the control unit 42 with the prescribed format based on the control of the control unit 42 and transmits the resultant transmission data to the base unit 32 via the portable unit side antenna 35 and moreover, receives the transmission data transmitted from the base unit 32 via the portable unit side antenna 35 and demodulates the received transmission data with the prescribed format based on the control of the control unit 42 to convert into data formed of the second data format. In this way, the high frequency unit 44 modulates the second call information data D31 inputted from the control unit 42 and transmits the resultant first call transmission data D32 to the base unit 32 via the portable unit side antenna 35.

Thus, in the portable unit 31, when the base unit 32 receives the first call transmission data D32 and then wire-connected to the calling party, the user's voice is inputted via a microphone 45. The microphone 45 converts the user audio signal S10 (analog) corresponding to the inputted user's voice into the first user voice data D33 (digital) via an A/D converter 46 to transmit to the control unit 42 via the man machine interface 41.

The control unit 42 converts the inputted first user voice data D33 into the second user voice data D34 formed of the second data format to transmit to the high frequency unit 44. The high frequency unit 44 modulates the inputted second user voice data D34 and transmits the resultant voice transmission data D35 to the base unit 32 via the portable unit side antenna 35.

Moreover, in the portable unit 31, the high frequency unit 44 receives the other party side transmission data D36, which is formed of voice data of the communicating party, transmitted from the base unit 32 under the condition wire-connected to the calling party via the portable unit side antenna 35.

The high frequency unit 44 demodulates the received other party side transmission data D36, and transmits the resultant first other party side voice data D37 formed of digital data to the control unit 42.

The control unit 42 converts the first other party side voice data D37 inputted from the high frequency unit 44 into the second other party side voice data D38 formed of the first data format to transmit to D/A converter 47 via the man machine interface 41, and the data D38 is converted into the other party side audio signal S11 which is analog at the D/A converter 47 to be transmitted to a speaker 48. With this arrangement, the portable unit 31 makes the speaker 48 utter voice of the other party. Thus, the user having the portable unit 31 and the calling party can talk to each other.

Moreover, in the portable unit 31, when a call arrives, the high frequency unit 44 receives the ringer transmission data D39, which is transmitted from the base unit 32, corresponding to the ringer data obtained from the communicating party, via the portable unit side antenna 35.

The high frequency unit 44 demodulates the received ringer transmission data D39 and transmits the resultant first ringer data D40 to the control unit 42.

The control unit 42 converts the inputted first ringer data D40 into the second ringer data D41 having the first data format to transmit to the ringer 49 via the man machine interface 41. Thus, the ringer 49 makes calling sound such as bell based on the inputted second ringer data D41. Thus, the user knows the telephone call depending on the calling sound made by the ringer 49 and then operates, for example, the call keys on the operation key section 40, so that the portable unit 31 and the calling party can be wire-connected.

Under this condition, in the portable unit 31, the user and the calling party can talk to each other in a similar way to the case of making a call described above. In this connection, an earphone jack 50 is provided in the portable unit 31, and the user's voice can be inputted via an earphone microphone for communication (not shown) connected to the earphone jack 50 and simultaneously, the calling party's voice can be outputted.

At this point, a serial interface unit formed of RS-232C or the like (hereinafter, referred to as a serial I/F unit) 51 is provided in the portable unit 31, and a PC 52 is connected with the serial I/F 51 and thus, the data communications can be conducted with the communicating party.

At first, in the portable unit 31, when transmitting data to the communicating party from the PC 52, the user operates the keyboard provided to the PC 52 to input call information corresponding to the communicating party, thereby third call information data D45 is transmitted to the control unit 42 from the PC 52 via the serial I/F unit 51.

The control unit 42 converts the inputted third call information data D45 into fourth call information data D46 formed of the second data format to transmit to the high frequency unit 44. The high frequency unit 44 modulates the inputted fourth call information data D46 and transmits the resultant transmission data (hereinafter, referred to as second call transmission data) D47 to the base unit 32 via the portable unit side antenna 35.

Accordingly, in the portable unit 31, when the base unit 32 receives the second call transmission data D47 and is wire-connected to the data communicating party based on this, the user inputs data to be communicated for communication by operating the keyboard of the PC 52, thereby first digital data D48 corresponding to the data to be communicated for communication is outputted from the PC 52 to the control unit 42 via the serial I/F unit 51.

The control unit 42 converts the inputted first digital data D48 into the digital data D49 formed of the second data format (hereinafter, referred to as first communication data) to output to the high frequency unit 44. The high frequency unit 44 modulates the inputted first communication data D49 and transmits the resultant transmission data D50 (hereinafter, referred to as first transmission data for communication) to the base unit 32 via the portable unit side antenna 35.

On the other hand, in the portable unit 31, when the data is transmitted from the communicating party to the PC 52, the high frequency unit 44 receives the transmission data (hereinafter, referred to as the second transmission data for communication) D51, which is transmitted from the telephone network via the base unit 32, corresponding to the data to be communicated via the portable unit side antenna 35. The high frequency unit 44 demodulates the received second transmission data for communication D51 and transmits the resultant digital data (hereinafter, referred to as the second communication data) D52 to the control unit 42.

The control unit 42 converts the inputted second transmission data D52 into the digital data (hereinafter, referred to as second digital data) D53 formed of the first data format to transmit to the PC 52 via the serial I/F unit 51. At this time, the control unit 42 corrects and outputs errors occurred in the second digital data D53 (errors occurred in the wireless zone between the portable unit 31 and the base unit 32) on occasion. With this arrangement, the PC 52 displays the communication information shown by the inputted second digital data D53 on a display unit (not shown) provided in the PC 52 and thereby, the user can visually conform the content of the data communication.

In this connection, the portable unit 31 is driven by the electric power to be obtained from a battery 53 provided inside, and the battery 53 is charged from an battery (not shown) which is outside of the portable unit 31, via the battery control unit 54.

In this case, the battery control unit 54 controls charging and discharging of the battery 53 preventing the battery 53 from being over charged or over discharged and moreover, outputs the remaining capacity of the battery 53 to the LCD 43 via the man machine interface 41 as battery information data D55 to make the LCD 43 display information of the battery 53 shown by the battery information data D55.

Figure 3:
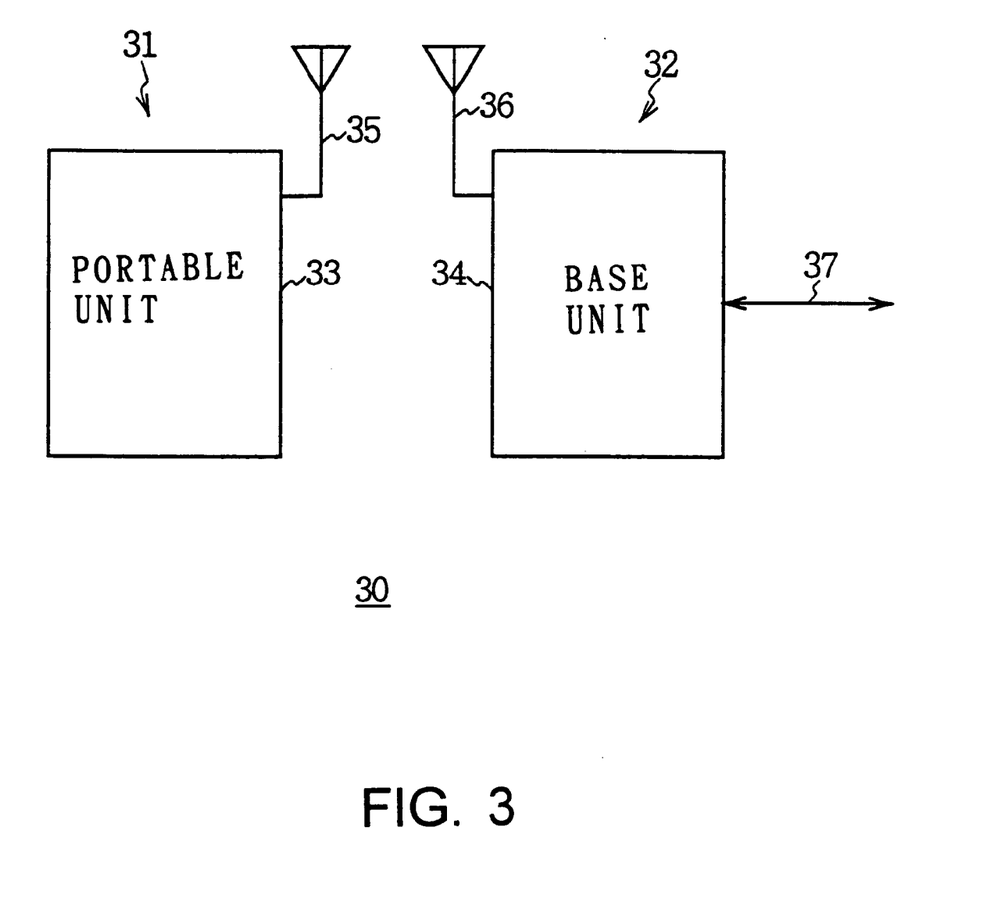
FIG. 3 is a block diagram showing one embodiment of the circuit configuration of a base unit.

Furthermore, as shown in FIG. 3, in the base unit 32 of the digital cordless telephone system 30 according to the present invention, when the portable unit 31 makes a call, the high frequency unit 60 receives the first call transmission data D32 transmitted from the portable unit 31, via the base unit side antenna 36.

In this case, the high frequency unit 60 functions similar to the aforementioned high frequency unit 44 of the portable unit 31, and receives the transmission data transmitted from the portable unit 31 via the base unit side antenna 36, demodulates the transmission data based on the control of the control unit 61 with the prescribed format to convert into the data formed of the second data format, and transmits the resultant data to the control unit 61. Moreover, the high frequency unit 60 receives the data having the second data format from the control unit 61, modulates the inputted data with the prescribed format based on the control of the control unit 61, and transmits the resultant transmission data to the portable unit 31 via the base unit side antenna 36. In this way, the high frequency unit 60 firstly demodulates the received first call transmission data D32 and transmits the resultant second call information data D31 to the control unit 61.

The control unit 61 applies the HDLC system just as the aforementioned control unit 42 of the portable unit 31, and converts the data having the second data format inputted from the high frequency unit 60 into the first data format to transmit to a circuit control unit 62 via a D/A converter (not shown) provided inside and moreover, judges based on the CRC added to the data having the second data format whether or not errors occur in the data, and if errors occur in the data, errors in the data can be corrected by requesting the portable unit 31 to retransmit the data as occasion demands.

In this connection, an error occurrence detecting circuit (not shown) is provided in the control unit 61 just as the aforementioned control unit 42 of the portable unit 31. The error occurrence detecting circuit detects the frequency of the occurrence of errors occurred in the data in the wireless zone between the portable unit 31 and the base unit 32 and as a result of this detection, if the frequency of the occurrence of error is less than the predetermined value set in advance, stops the error correction. Thus, the control unit 61 can decrease the data processing add-ons according to the frequency of the occurrence of errors occurred in the data.

Furthermore, the control unit 61 digitizes an analog signal inputted from the circuit control unit 62, via an A/D converter (not shown) provided inside to convert into data formed of the first digital format, and then converts the data into the second data format to which the CRC corresponding to the data is added, to transmit to the high frequency unit 60.

Then, the control unit 61 converts the second call information data D31 inputted from the high frequency unit 60 into an analog call information signal S15 to transmit to the telephone network via the circuit control unit 62 and the wire connection line 37 successively.

Thus, in the telephone network the base unit 32 and the calling party can be wire-connected based on the inputted call information signal S15.

At this point, in the base unit 32, in a state where connecting to the calling party, the high frequency unit 60 receives the voice transmission data D35 transmitted from the portable unit 31 via the base unit side antenna 36, demodulates the received voice transmission data D35, and transmits the resultant second user voice data D34 to the control unit 61.

The control unit 61 converts the inputted second user voice data D34 into an Analog user audio signal S1 and transmits the user audio signal S10 to the telephone network via the circuit control unit 62 and the wire connection line 37 sequentially.

Furthermore, in the base unit 32, the other party side audio signal S11 to be obtained via the telephone network is supplied into the control unit 61 via the wire connection line 37 and the circuit control unit 62 successively.

In this case, the control unit 61 digitizes the inputted other party side audio signal S11 and then converts into the first other party side voice data D37 formed of the second data format to transmit to the high frequency unit 60.

The high frequency unit 60 modulates the inputted first other party side voice data D37 and transmits the resultant other party side transmission data D36 to the portable unit 31 via the base unit side antenna 36.

In this way, the base unit 32 enables the user having the portable unit 31 and the calling party to talk each other.

Moreover, in the base unit 32, when the portable unit 31 receives a call, a ringer signal S17 which is analog obtained from the telephone network is inputted via the wire connection line 37 and the circuit control unit 62 successively.

The control unit 61 digitizes the inputted ringer signal S17 and then converts into first ringer data D40 formed of the second data format to transmit to the high frequency unit 60.

The high frequency unit 60 modulates the inputted first ringer data D40 and transmits the resultant ringer transmission data D39 to the portable unit 31 via the base unit side antenna 36. Thus, when the portable unit 31 and the calling party are wire-connected, the base unit 32 makes it possible that the user and the calling party can talk to each other just as the case where the portable unit makes a call.

Furthermore, in the base unit 32, when the data is transmitted to the communicating party from the PC 52 connected to the portable unit 31, the high frequency unit 60 receives the second call transmission data D47 transmitted from the portable unit 31 via the base unit side antenna 36. The high frequency unit 60 demodulates the received second call transmission data D47 and transmits the resultant fourth call information data D46 to the control unit 61.

In this case, the control unit 61 switches its connection from the circuit control unit 62 to a buffer 63 based on the inputted fourth call information data D46 (i.e., call information to be obtained from the PC 52), and then until finishing the data communications from the PC 52 to the communicating party, the control unit 62 transmits all of the data obtained from the portable unit to the buffer unit 63 and write in and moreover, controls the readout timing of the buffer 63 to transmit the data, written in the buffer 63, to the modem unit 64.

In this connection, the frequency of the occurrence of errors with respect to the signal to be transmitted in the wire zone between the base unit 32 and the telephone network is comparatively low. On the other hand, in the wireless zone between the base unit 32 and the portable unit 31, the transmission data is susceptible to noise and the frequency of the occurrence of errors is comparatively large. Accordingly, the control unit 61, by correcting errors which occurred in the data in the wireless zone in a state of writing and storing the data in the buffer 63, can make the frequency of the occurrence of overall errors between the PC 52 connected to the portable unit 31 and the communicating party greatly decrease.

In practice, the control unit 61 firstly converts the inputted fourth call information data D46 into the third call information data D45 formed of the first data format to transmit to the buffer 63 and write in and moreover, controls the readout timing of the buffer 63 to read the third call information data D45 and transmits to the modem unit 64.

The modem unit 64 forms a modulated wave signal (hereinafter, referred to as call modulated wave signal) S18 showing the third call information data D45 by phase-modulating the prescribed carrier wave in accordance with the inputted third call information data D45, and transmits the formed call modulated wave signal S18 to the telephone network via the circuit control unit 62 and the wire connection line 37 in order. Thus, in the telephone network, the base unit 32 and the communicating party will be wire-connected based on the call modulated wave signal S18 to be obtained from the base unit 32.

Under this condition, in the base unit 32, the high frequency unit 60 receives the first transmission data for communication D50 transmitted from the portable unit 31 via the base unit side antenna 36. The high frequency unit 60 demodulates the received first transmission data for communication D50 and transmits the resultant first communication data D49 to the control unit 61.

The control unit 61, after converting the inputted first communication data D49 into the first digital data D48 formed of the first data format, transmits the data D48 to the buffer 63 and writes in and moreover, reads the first digital data D48 from the buffer unit 63 by controlling the readout timing of the buffer unit 63 and transmits to the modem unit 64.

Thus, the modem unit 64, by phase-modulating the prescribed carrier wave in accordance with the inputted first digital data D48, forms a modulated wave signal (hereinafter, referred to as a first modulated wave signal) S19 showing the first digital data D48 and transmits the formed first modulated wave signal S19 to the telephone network via the circuit control unit 62 and the wire connection line 37 in order.

Furthermore, in the base unit 32, when the data is transmitted from the communicating party to the PC 52 connected to the portable unit 31, a modulated wave signal (hereinafter, referred to as a second modulated wave signal) S20 which is obtained from the communicating party is inputted to the modem unit 64 from the telephone network via the wire connection line 37 and the circuit control unit 62 in order.

In this case, the modem unit 64 detects the phase displacement point of the inputted second modulated wave signal S20, demodulates the second modulated wave signal S20 based on the detected phase displacement point, and transmits the resultant second digital data D53 formed of the first data format to the buffer 63 and writes in.

At this point, the control unit 61 reads the second digital data D53 from the buffer 63 by controlling the readout timing, and converts the read second digital data D53 into the second communication data D52 formed of the second data format to transmit to the high frequency unit 60. The high frequency unit 60 modulates the inputted second communication data D52 and transmits the resultant second transmission data for communication D51 to the portable unit 31 via the base unit side antenna 36.

With this arrangement, the base unit 32 makes it possible that the PC 52 connected to the portable unit 31 and the communicating party can communicate with each other.

In recent years, the starting of the caller's telephone number displaying service for informing the caller's telephone number to the person who receives a call from the caller has been planned. According to the caller's telephone number displaying service, the telephone number information of the caller can be provided to the person receiving the call as the modulated wave signal via the telephone network.

According to this embodiment, in the digital cordless telephone system 30, when receiving a call, a modulated wave signal formed of the telephone number transmitted via the telephone network can be inputted to the modem unit 64 via the wire connection line 37 and the circuit control unit 62 in order in the base unit 32, so that this embodiment can easily cope with the caller's telephone number displaying service.

According to the foregoing construction, in the digital cordless telephone system 30, when communicating data, firstly, the connection of the control unit 61 of the base unit 32 is switched to the buffer 63 based on the third call information data D45 to be outputted from the PC 52 connected to the serial I/F unit 51 of the portable unit 31, and after converting the fourth call information data D46 into the third call information data D45 at the control unit 61, transmits the data D45 to the modem unit 64 via the buffer 63. Thus, in the digital cordless telephone system 30, the call modulated wave signal S18 corresponding to the third call information data D45 is formed in the modem unit 64 and transmitted to the telephone network via the circuit control unit 62 and the wire connection line 37 in order. Thus, in the digital cordless telephone system 30, the base unit 32 can be wire-connected to the communicating party via the telephone network.

Under this condition, in the digital cordless telephone system 30, the first digital data D48 transmitted from the PC 52 is inputted to the control unit 42 via the serial I/F unit 51 of the portable unit 31, and the control unit 42 converts the first digital data D48 into the first communication data D49 to transmit to the high frequency unit 44, and then, the high frequency unit 44 modulates the first communication data D49 and transmits the resultant first transmission data for communication D50 to the base unit 32 via the portable unit side antenna 35.

Accordingly, in the digital cordless telephone system 30, the high frequency unit 60 of the base unit 32 receives the first transmission data for communication D50 transmitted from the portable unit 31 via the base unit side antenna 36, demodulates the first transmission data for communication D50, and outputs the resultant first communication data D49 to the control unit 61. The control unit 61, after converting the inputted first communication data D49 into the first digital data D48, transmits to the buffer 63 and writes in to correct errors which occurred in the first digital data D48 as occasion demands, and then, reads out the first digital data D48 from the buffer 63 by controlling the readout timing to output to the modem unit 64. Thus, the modem unit 64 of the base unit 32 forms the first modulated wave signal S19 corresponding to the first digital data D48 and transmits the signal S19 to the telephone network.

Furthermore, in the digital cordless telephone system 30, the second modulated wave signal S20 obtained from the telephone network is inputted to the modem unit 64 of the base unit 32, and the modem unit 64 demodulates the second modulated wave signal S20 to convert it into the second digital data D53 and outputs the data D53 to the control unit 61 via the buffer 63, thereby the control unit 61 converts the second digital data D53 into the second communication data D52 to output to the high frequency unit 60. The high frequency unit 60 of the base unit 32 modulates the second communication data D52 and transmits the resultant second transmission data for communication D51 to the portable unit 31 via the base unit side antenna 36.

With this arrangement, in the digital cordless telephone system 30, the second transmission data for communication D51 transmitted from the base unit 32 is received by the high frequency unit 44 via the portable unit side antenna 35 of the portable unit 31, and the high frequency unit 44 demodulates the second transmission data for communication D51 to convert into the second communication data D52 and outputs the data D52 to the control unit 42. Then, the control unit 42 of the portable unit 31 converts the second communication data D52 into the second digital data D53, and corrects errors which occurred in the second digital data D53 as occasion demands to transmit to the PC 52 via the serial I/F unit 51. Thus, the digital cordless telephone system 30 can perform data communications.

In this case, in the digital cordless telephone system 30, the portable unit 31 is equipped with the serial I/F unit 51 to be connected to the PC 52 via the serial I/F unit 51 and moreover, the base unit 32 is equipped with the buffer 63 and the modem unit 64, so that the first digital data D48 outputted from the PC 52 is supplied to the modem unit 64 of the base unit 32 to be modulated in a state where the modem unit 64 of the base unit 32 and the PC 52 are seemingly connected, and the resultant first modulated wave signal S19 can be transmitted to the telephone network and moreover, the second modulated wave signal S20 obtained from the telephone network can be supplied to the modem unit 64 to be demodulated, and the resultant second digital data D53 can be supplied to the PC 52. Thus, the transmission data can be transmitted in the wireless zone between the base unit 31 and the portable unit 32 at the preset transmission rate without conducting the data coding processing between the portable unit 31 and the base unit 32.

In addition to the above, in the digital cordless telephone system 30, the first digital data D48 is written in the buffer 63 of the base unit 32 and moreover, the first digital data D48 is read out from the buffer 63 by controlling the readout timing so that the predetermined volume of the first digital data D48 remains in the buffer 63 and transmitted to the modem unit 64, so that the first modulated wave signal S19 can be transmitted from the modem unit 64 to the telephone network at the transmission rate which in the modem unit 64 has been set in advance so as to be slower than that in wireless zone.

Furthermore, in the digital cordless telephone system 30, the control unit 61 of the base unit 32 writes the first digital data D48 in the buffer 63 to correct errors which occurred in the first digital data D48 in the wireless zone as necessary, and transmits the first digital data D48 to the modem unit 64 and moreover, the control unit 42 of the portable unit 31 corrects errors which occurred in the second digital data D53 in the wireless zone as necessary and transmits the second digital data D53 to the PC 52, so that the frequency of the occurrence of overall errors between the PC 52 connected to the portable unit 31 and the communicating party connected to the base unit 32 via the telephone network can be greatly reduced.

Furthermore, in the digital cordless telephone system 30, the error occurrence detecting circuit is provided in the control unit 42 of the portable unit 31 and also the error occurrence detecting circuit is provided in the control unit 61 of the base unit 32 so that the error occurrence detecting circuit detects the frequency of the occurrence of errors occurred in the wireless zone and as a result of the detection, if the frequency of the occurrence of errors is lower than the preset value, stops error correction processing, and thereby the data processing add-ons between the portable unit 31 and the base unit 32 can be reduced as occasion demands.

Moreover, in the digital cordless telephone system 30, since the modem unit 64 is provided in the base unit 32, in the case where the modem unit is built-in to the PC 52 which is connected to the portable unit 31, the PC 52 can be simply constructed without modem unit, and plural types of data terminals such as the PC 52 to be connected to the portable unit 31 can be simply constructed.

Furthermore, in the digital cordless telephone system 30, since the modulated wave signal formed of telephone number to be transmitted from the telephone network at the time of call arrival can be inputted to the modem unit 64 of the base unit 32 by the caller telephone number displaying service, information corresponding to the modulated wave signal can be transmitted from the base unit 32 to the portable unit 31 and can be displayed on the display unit provided on the LCD 43 and/or the PC 52 of the portable unit 31, and thereby the general versatility of the digital cordless telephone system 30 can be improved.

Furthermore, the portable unit 31 of the digital cordless telephone system 30 corrects errors in the second digital data D53 to be obtained from the base unit 32 as necessary (according to the frequency of the occurrence of errors) to output to the PC 52, so that the reliability at the time when communicating the data from the base unit 32 to the PC 52 connected to the portable unit 31 can be greatly improved.

According to the foregoing construction, in the digital cordless telephone system 30, the serial I/F unit 51 is provided in the portable unit 31 to be connected to the PC 52, and the first digital data D48 obtained from the PC 52 connected to the serial I/F unit 51 is transmitted to the base unit 32 and moreover, errors in the second digital data D53 transmitted from the base unit 32 is corrected at the control unit 42 as necessary and then the second digital data S53 is outputted to the PC 52 and in addition, the buffer 63 and the modem unit 64 are provided in the base unit 32, and the first digital data D48 transmitted from the portable unit 31 is written in the buffer 63, and under this condition, the control unit 61 corrects errors in the first digital data D48 as necessary to transmit to the modem 64 and thereby, the modem unit 64 modulates the first digital data D48 and transmits the resultant first modulated wave signal S19 to the telephone network and moreover, the modem unit 64 demodulates the second modulated wave signal S20 obtained from the telephone network to form the second digital data D53 and transmits to the portable unit 31, so that the transmission data can be transmitted in the wireless zone between the portable unit 31 and the base unit 32 at the preset transmission rate and moreover, the frequency of the occurrence of overall errors between the PC 52 and the communicating party connected to the base unit 32 via the telephone network can be greatly reduced, and thus a wireless communication system capable of easily improving the efficiency in data communication can be realized.

Furthermore, the buffer 63 and the modem unit 64 are provided in the base unit 32, and the first digital data D48 transmitted from the portable unit 31 is written in the buffer 63, and under this condition, the first digital data D48 is transmitted to the modem unit 64 after error correction by the control unit 61 as occasion demands, and then the first digital data D48 is modulated at the modem unit 64 and the resultant first modulated signal S19 is transmitted to the telephone network and simultaneously, the second modulated wave signal S20 obtained from the telephone network is modulated at the modem unit 64 to form and transmit the second digital data D53 to the portable 31, so that the second transmission data for communication D51 can be transmitted in the wireless zone between the portable unit 31 and the base unit 32 at the preset transmission rate and moreover, the frequency of the occurrence of overall errors between the PC 52 and the communicating party wire-connected to the base unit 32 via the telephone network can be reduced by decreasing the frequency of the occurrence of errors in the first digital data D48, and thus a fixed station device capable of improving the efficiency of data communications can be realized.

Furthermore, the serial I/F unit 51 is provided in the portable unit 31 to be connected to the PC 52, the first digital data D48 to be obtained from the PC 52 connected to the serial I/F unit 51 is transmitted to the base unit 32 and moreover, the second digital data D53 transmitted from the base unit 32 is error-corrected at the control unit 42 as necessary and transmitted to the PC 52, so that the first transmission data for communication D50 can be transmitted at the transmission rate of the wireless zone between the portable unit 31 and the base unit 32 and moreover, the frequency of the occurrence of errors in the second digital data D53 can be reduced and also the frequency of the occurrence of errors between the PC 52 and the communicating party wire-connected to the base unit 32 via the telephone network can be reduced, and thus the mobile station device capable of improving the efficiency of data communications can be realized.

Note that, in the aforementioned embodiment described, the PC 52 is applied as the prescribed data terminal to be connected to the mobile station device 31 via the connecting means 51. However, the present invention is not limited thereto and various other data terminals, such as an electronic notebook and a video camera, and the device in which a data terminal and a mobile station device are combined in a single-piece construction can be applied.

Further, in the aforementioned embodiment, the serial I/F unit 51 is applied as the connecting means to which the prescribed data terminal 52 is connected. However, the present invention is not limited thereto and various other connecting means such as the connecting means using infrared communications can be applied as long as the connecting means can be connected to aforementioned data terminals.

Furthermore, in the aforementioned embodiment, the control unit 42, the high frequency unit 44, and the portable unit side antenna 36 are applied as the transmitting means for transmitting the first digital data D48 inputted from the data terminal 52 connected to the connecting means 51 via the connecting means, to the fixed station device 32. However, the present invention is not limited thereto and the transmitting means having various other constructions can be applied as long as the first digital data D48 to be inputted from the data terminal 52 via the connecting means 51 can be transmitted to the fixed station device 32.

Furthermore, in the aforementioned embodiment, the portable unit side antenna 35, the high frequency unit 44 and the control unit 42 are applied as the receiving means for receiving the second digital data D53 transmitted from the fixed station device 32. However, the present invention is not limited thereto and the receiving means having various other constructions can be applied as long as the second digital data D53 transmitted from the fixed station device 32 can be received.

Moreover, in the aforementioned embodiment, the control unit 42 is applied as the first error correcting means for correcting errors occurred in the second digital data D53 in the wireless zone between the mobile station device 31 and the fixed station device 32 and for transmitting the error-corrected second digital data D53 to the data terminal 52 via the connecting means 51. However, the present invention is not limited thereto and the first error correcting means having various other constructions can be applied as long as the errors which occurred in second digital data D53 in the wireless zone can be corrected and the error-corrected second digital data D53 can be transmitted to the data terminal 52 via the connecting means 51.

Furthermore, in the aforementioned embodiment, the base unit side antenna 36, the high frequency unit 60, and the control unit 61 are applied as the receiving means for receiving the first digital data D48 transmitted from the mobile station device 31. However, the present invention is not limited thereto and the receiving means having various other constructions can be applied as long as the first digital data D48 transmitted from the mobile station device 31 can be received.

Moreover, in the aforementioned embodiment, the control unit 61 and the buffer 63 are applied as the second error correcting means for correcting errors occurred in the first digital data D48 in the wireless zone between the mobile station device 31 and the fixed station device 32. However, the present invention is not limited thereto and the second error correcting means having various other constructions can be applied as long as errors which occurred in the first digital data D48 in the wireless zone can be corrected.

Moreover, in the aforementioned embodiment, the modem unit 64 is applied as the modulating/demodulating means for modulating the first digital data D48 outputted from the second error correcting means 61 and 63 and transmitting the resultant first modulated wave signal S19 to the telephone network and for demodulating the second modulated wave signal S20 inputted from the telephone network to form the second digital data D53. However, the present invention is not limited thereto and the modulating/demodulating means having various other constructions can be applied as long as the first digital data D48 outputted from the second error correcting means 61 and 63 can be modulated and the resultant first modulated wave signal S19 can be transmitted to the telephone network and moreover, the second modulated wave signal S20 inputted from the telephone network can be demodulated to form the second digital data D53.

Moreover, in the aforementioned embodiment, the buffer 63, the control unit 61, the high frequency unit 60 and the base unit side antenna 36 are applied as the transmitting means for transmitting the second digital data D53 outputted from the modulating/demodulating means 64 to the mobile station device 31. However, the present invention is not limited thereto and the transmitting means having various other constructions can be applied as long as the second digital data D53 outputted from the modulating/demodulating means 64 can be transmitted to the mobile station device 31.

Furthermore, in the aforementioned embodiment, errors which occurred in the first and second digital data D48 and D53 in the wireless zone are corrected based on the CRC code. However, the present invention is not limited thereto and errors can be corrected based on various error control systems such as a return check system and serial transmission system, which provide redundancy to the transmitting/receiving system, and a character check system and block check system, which provide the redundancy in the data to be transmitted.

Moreover, in the aforementioned embodiment, the base unit 32 and the telephone network are wire-connected. However, the present invention is not limited thereto and the base unit 32 and the telephone network can be connected via a communication satellite (wireless connection) or via network such as a cable television.

Note that, in this case, the circuit control unit 62 of the base unit 32 can be changed to the construction for wireless communication or to the interface for the cable television according to the connection system between the base unit 32 and the telephone network. Moreover, in addition, the signal to be transmitted between the base unit 32 and the telephone network can be changed from analog form to digital form.

According to the present invention as described above, the mobile station device comprises the connecting means to which the data terminal is connected, the transmitting means for transmitting the first digital data to be inputted from the data terminal via the connecting means to the fixed station device, the receiving means for receiving the second digital data transmitted from the fixed station device, and the first error correcting means for correcting errors which occurred in the second digital data in the wireless zone between the mobile station device and the fixed station device and transmitting the error-corrected second digital data to the data terminal via the connecting means and moreover, the fixed station device comprises the receiving means for receiving the first digital data transmitted from the mobile station device, the second error correcting means for correcting errors which occurred in the first digital data in the wireless zone, the modulating/demodulating means for modulating the first digital data outputted from the second error correcting means and transmitting the resultant first modulated wave signal to the telephone network and for demodulating the second modulated wave signal inputted from the telephone network to form the second digital data, and the transmitting means for transmitting the second digital data outputted from the modulating/demodulating means to the mobile station device, so that the first digital data and the second digital data can be transmitted at the preset transmission rate in the wireless zone between the mobile station device and the fixed station device and moreover, the frequency of the occurrence of errors between the data terminal and the communicating party wire-connected to the fixed station device via the telephone network can be greatly reduced. Thus the wireless communication system capable of easily improving the efficiency of data communications can be realized.

Furthermore, the receiving means for receiving the first digital data transmitted from the mobile station device, the error correcting means for correcting errors which occurred in the first digital data in the wireless zone between the mobile station device and the fixed station device, the modulating/demodulating means for modulating the first digital data outputted from the error correcting means and transmitting the resultant first modulated wave signal to the telephone network and for demodulating the second modulated wave signal inputted from the telephone network to form the second digital data, and the transmitting means for transmitting the second digital data outputted from the modulating/demodulating means to the mobile station device are provided, so that the second digital data can be transmitted at the transmission rate of the wireless zone in the wireless zone from the fixed station device to the mobile station device and moreover, the frequency of the occurrence of errors between the data terminal and the communicating party can be reduced by correcting errors which occurred in the first digital data in the wireless zone. Thus the fixed station device capable of easily improving the efficiency of data communications can be realized.

Moreover, according to the third invention, the connecting means to which the data terminal is connected, the transmitting means for transmitting the first digital data inputted from the data terminal via the connecting means to the fixed station device, the receiving means for receiving the second digital data transmitted from the fixed station device, and the error correcting means for correcting errors which occurred in the second digital data in the wireless zone between the mobile station device and the fixed station device and transmitting the second digital data to the data terminal via the connecting means are provided, so that the first digital data can be transmitted at the transmission rate of the wireless zone in the wireless zone from the mobile station device to the fixed station device and moreover, the frequency of the occurrence of errors between the data terminal and the communicating party can be reduced by correcting errors which occurred in the second digital data in the wireless zone and outputting to the data terminal. Thus the mobile station device capable of easily improving the efficiency of data communications can be realized.

While there has been described in connection with preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A wireless communication system that includes a mobile station device and a fixed station device wireless-connected to said mobile station device and connected to a telephone network, said mobile station device comprising:

connecting means including a digital serial interface unit for connecting said mobile station device directly to a digital data terminal, wherein said digital data terminal and said mobile station device are devoid of modems;

first transmitting means for transmitting to said fixed station device at a wireless transmission rate first digital data input via said connecting means from said digital data terminal directly connected to said connecting means;

first receiving means for receiving second digital data transmitted at said wireless transmission rate from said fixed station device; and first error correcting means for correcting first transmission errors which occurred in said second digital data in a wireless zone between said mobile station device and said fixed station device and transmitting corrected second digital data to said digital data terminal directly connected to said connecting means, and said fixed station device comprising:

second receiving means for receiving at said wireless transmission rate said first digital data transmitted from said mobile station device;

second error correcting means for correcting second transmission errors which occurred in said first digital data in said wireless zone between said mobile station device and said fixed station device and for producing corrected first digital data, wherein said second error correcting means includes a buffer memory for storing said corrected first digital data, and said second error correcting means controls a readout timing of said buffer memory to correspond to a modem transmission rate slower than said wireless transmission rate;

modulating/demodulating means directly connected to said buffer memory for modulating said corrected first digital data produced by said second error correcting means and for transmitting a first modulated wave signal produced by said modulation/demodulation means to said telephone network at said modem transmission rate and for demodulating a second modulated wave signal input from said telephone network to produce said second digital data; and second transmitting means for transmitting at said wireless transmission rate said second digital data produced by said modulating/demodulating means to said mobile station device.

2. The wireless communication system according to claim 1, wherein said first error correcting means detects a frequency of occurrence of the first errors which occurred in said second digital data and as a result of the detection, if the frequency of the occurrence of the first errors is less than a predetermined value, stops the correction of the first errors which occurred in said second digital data.

3. The wireless communication system according to claim 1, wherein said second error correcting means detects a frequency of occurrence of the second errors which occurred in said first digital data and as a result of the detection, if the frequency of the occurrence of the second errors is less than a predetermined value, stops the correction of the second errors which occurred in said first digital data.

4. The wireless communication system according to claim 1, wherein said modulating/demodulating means, when a call arrives, receives telephone number information transmitted via said telephone network, the output of said modulating/demodulating means including the received telephone number information; and said second transmitting means transmits the telephone number information outputted from said modulating/demodulating means to said mobile station device.

* * * * *